US007681972B2

(12) United States Patent
Sakurai

(10) Patent No.: US 7,681,972 B2
(45) Date of Patent: Mar. 23, 2010

(54) ELEMENT SUBSTRATE, RECORDING HEAD USING THE ELEMENT SUBSTRATE, AND RECORDING APPARATUS

(75) Inventor: Masataka Sakurai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 561 days.

(21) Appl. No.: 11/040,425

(22) Filed: Jan. 21, 2005

(65) Prior Publication Data

US 2005/0162450 A1 Jul. 28, 2005

(30) Foreign Application Priority Data

Jan. 23, 2004 (JP) ............................ 2004-015523

(51) Int. Cl.
*B41J 29/38* (2006.01)
*H04N 5/228* (2006.01)

(52) U.S. Cl. ............... 347/12; 347/5; 347/9; 348/222.1

(58) Field of Classification Search ............. 348/222.1; 347/5, 9, 12
See application file for complete search history.

(56) References Cited

U.S. PATENT DOCUMENTS

| | | | | |
|---|---|---|---|---|
| 7,116,358 | B1 * | 10/2006 | Sasaki | 348/222.1 |
| 2001/0048459 | A1 * | 12/2001 | Sakai et al. | 347/233 |
| 2002/0118241 | A1 * | 8/2002 | Fujii | 347/12 |

FOREIGN PATENT DOCUMENTS

| | | |
|---|---|---|
| JP | 8-108550 A | 4/1996 |

* cited by examiner

*Primary Examiner*—Matthew Luu
*Assistant Examiner*—Jannelle M Lebron
(74) *Attorney, Agent, or Firm*—Canon USA Inc IP Div

(57) ABSTRACT

A buffer circuit for shaping a waveform of a logic signal is arranged where a line for a logic circuit included in a recording-head substrate is divided into substantially equal portions, the line having an unignorable parasitic component due to its increased length. Therefore, the recording-head substrate, a recording head using the recording-head substrate, and a recording apparatus including the recording head are capable of minimizing the adverse effects of parasitic resistance and parasitic capacitance in lines even when the length of a heater array is increased.

3 Claims, 7 Drawing Sheets

300

ELEMENT SUBSTRATE, RECORDING HEAD USING THE ELEMENT SUBSTRATE, AND RECORDING APPARATUS

BACKGROUND OF THE INVENTION

1. Field of the Invention

The present invention relates to recording-head substrates, recording heads using the recording-head substrates, and recording apparatuses including the recording heads. In particular, the present invention relates to a recording-head substrate used for discharging ink by, for example, inkjet technologies so as to record information, a recording head using the recording-head substrate, and a recording apparatus including the recording head.

2. Description of the Related Art

As apparatuses for outputting information used in, for example, word processors, personal computers, and facsimiles, printers for recording information, such as desired text and images, on sheet recording media, such as paper or film, are used.

Various recording technologies in printers are available. Inkjet technologies have increasingly received attention in recent years because the inkjet technologies are capable of recording information on a recording medium, such as a sheet of paper, in a non-impact manner, of operating quietly, and of easily realizing color inkjet printers. In these inkjet technologies, serial recording methods, which record information by using a recording head for discharging ink in accordance with desired recording information while moving reciprocally in a direction perpendicular to the direction in which a recording medium is conveyed, has been widely used in general because the serial recording methods can realize inexpensive and small printers relatively easily.

Among the serial recording methods, a thermal inkjet method discharges a droplet of ink by using a bubble created by thermal energy generated by passing a current through a heater in contact with ink for several microseconds. According to this method, many nozzles can be arranged at high density in a recording head. This is advantageous in view of improvements in recording speeds, and therefore, this method has received much attention.

A recording head in a recording apparatus according to such a thermal inkjet method uses an element substrate in which a heater for heating ink, a protective film for the heater, a driving circuit for passing a current through the heater, a logic circuit for controlling the driving circuit, and the like are formed integrally on a single-crystal silicon semiconductor substrate by the same process for producing a semiconductor integrated circuit. Hereinafter, this recording head and this element substrate are referred to as “a recording head” and “a heater board”, respectively.

An example of the control of such a heater board in a recording head in a related art is described below.

FIG. 8 is a block diagram schematically showing the structure of the heater board in the related art.

Referring to FIG. 8, a heater board 300 includes a heater array (represented as “128 bit Heater” in FIG. 8) 301 having 128 heaters in sequence. The number of the heaters is not limited to 128. A plurality of heater arrays, each having the same number of heaters, facing each other may be used.

In FIG. 8, the heater array 301 is connected to a driver array (represented as “128 bit Driver” in FIG. 8) 302 having as many drivers as the heaters. The drivers are individually connected to the heaters so as to drive each of the heaters. The heater is a thin-film resistor having a resistance of several tens to several hundreds of ohms. The driver array 302 includes high-voltage power transistors having withstand voltages required for passing a current of several tens to several hundreds of milliamperes, and the number of these power transistors is the same as the number of heaters (128 in this example). Commonly, such a power transistor requires a withstand voltage for a dozen or so volts to several tens of volts.

The driver array 302 is connected to AND gates 303 for determining the on or off state of each of the drivers. A driver connected to an AND gate that produces a true output is selected in order to switch a corresponding heater to the on position.

An input terminal 306 is used for applying a signal (heat-enabling signal) for specifying a time for passing a current through the heater. For the time for which the heat-enabling signal is applied, a driver selected by the AND gates 303 is activated and a current flows through a corresponding heater.

In this example, as shown in FIG. 8, the AND gates 303 for selecting the drivers each have two input terminals. One input terminal of each of the AND gates 303 is connected to the output from a decoder (represented as “DECODER” in FIG. 8) 304. The decoder 304 deals with a 4-bit input and a 16-bit output. One input terminal of each of the AND gates 303 is connected to any one bit of the 16-bit output. The other input terminal of each of the AND gates 303 is connected to any one bit of the output (8-bit output) of a 12-bit shift register 305 (represented as “12 bit S/R”).

The remaining four bits of the output from the 12-bit shift register 305 are connected to an input terminal of the decoder 304, so that these four bits of data are decoded into a 16-bit signal in the decoder 304.

The 16-bit output from the decoder 304 and the 8-bit output from the 12-bit shift register 305 are subjected to AND operation so that a desired heater among the 128 heaters is selected and driven.

The 128 heaters are driven in a time shared manner in units of 16 sections divided by using the 16-bit output from the decoder 304. The maximum number of heaters simultaneously driven is eight. This occurs when all eight bits of output data from the 12-bit shift register 305 are determined to be true.

Signals applied when data is transferred to the 12-bit shift register 305 will now be described.

The 12-bit shift register 305 is connected to a data-signal input terminal 307, a clock-signal input terminal 308 for a clock signal to indicate a timing for capturing data, and a latch-signal input terminal 309 for a latch signal to indicate a timing for temporarily storing transferred data so as to receive three types of signals from these input terminals.

Serial data (DATA) to indicate a nozzle to be driven is input from a main system of a recording apparatus including the recording head via the data-signal input terminal 307 in synchronization with a clock signal (CLK) applied to the clock-signal input terminal 308. Inside the heater board, the serial data (DATA) is transferred to the 12-bit shift register 305 in synchronization with the clock signal (CLK), and the transferred serial data (DATA) is converted to parallel data at the 12-bit shift register 305. The parallel data is temporarily stored in a latch circuit (not shown) for storing data in accordance with the latch signal (LATCH) applied to the latch-signal input terminal 309.

The data corresponding to the last four bits of the serial data in the stored data is decoded at the decoder 304. The decoded data and the data corresponding to the first eight bits of the serial data are subjected to an AND operation at the AND gates 303, so that a desired driver of the drivers corresponding to the 128 heaters is selected.

In this example, the heaters are driven in a time shared manner, as described above, and therefore, the number of heaters selected simultaneously in the 128 heaters is limited to eight.

When a logical operation is determined so as to be ready to activate only a driver corresponding to a desired heater, as described above, a logical signal (heat-enabling signal (HENB)) to specify a time for passing a current through a heater from the main system of the recording apparatus is applied to the input terminal 306, so that a current is passed through only a heater corresponding to a desired nozzle for a time for which the heat-enabling signal is applied.

Input buffers 310 for shaping a waveform of a signal for driving an internal circuit are arranged adjacent to each pad of the input terminals (see, for example, Japanese Patent Laid-Open No. 8-108550).

In general serial printers, the length of the heater array is equal to the length of a recordable area in one pass of the recording head in the paper feed direction. In other words, recording is performed while the recording head is moved across the width of the recording medium; the recording medium is then advanced by the length of the heater array of the recording head in the direction to be recorded; recording is again performed while the recording head is moved. This process is repeated until the entire recording medium is recorded. Depending on the circumstances, moving the recording head is performed multiple times over a predetermined area of the recording medium (multiple-pass recording) so as to improve the recording quality.

In this type of printer, one requirement is to increase the recording speed. To this end, the number of heaters arranged is increased and the length of the heater array is extended, so that a recordable area of the recording medium in one pass of the recording head is increased. In addition, the length of the heater array is made equal to the width of the recording medium so that recording on the entire recording medium is performed at one time without moving the recording head. This type of the recording head (full-line-type recording head) further improves the recording speed.

In addition to increasing the number of heaters and the length of the heater array, for an inkjet recording method, the period of discharging droplets of ink from a nozzle corresponding to a heater of the recording head is reduced (the frequency of discharging droplets of ink is increased), thus improving the recording speed. In order to increase the length of the heater array (i.e., nozzle array) for further improvement in the recording speed, it is necessary to increase the physical length of the heater board.

In order to increase the number of nozzles, an increase in the number of gates of logic circuits inside the heater board to control the nozzles is required. In order to increase the frequency of discharging ink, the operating speed of the logic circuits must be increased correspondingly.

Generally, in a heater board, a logic circuit for controlling the heater board is included in an integrated circuit using a semiconductor process. Therefore, an increase in the length of the heater board itself results in an increase in the line length of the logic circuit inside the heater board. This leads to a characteristic problem with the heater board used in the recording head. Specifically, even if an integrated circuit technology that achieves a high operating speed by a fine-line circuit process is used, a recording head that has an increased line length in a circuit to improve the recording speed has a problem in that the operating speed of the circuit is decreased because the adverse effects of parasitic resistance and parasitic capacitance in the lines become unignorable.

SUMMARY OF THE INVENTION

The present invention aims to solve the above problems. It is an object of the present invention to provide a recording-head substrate that is capable of minimizing the adverse effects of parasitic resistance and parasitic capacitance in lines even when the length of a heater array is increased and capable of performing excellent recording at high speed; a recording head using the recording-head substrate; and a recording apparatus including the recording head.

An element substrate according to a first aspect of the present invention has the following structure.

The recording-head element substrate includes a plurality of blocks, at least one input terminal, a first signal line, and a first buffer. Each block includes a plurality of recording elements, a plurality of driving circuits for driving the plurality of recording elements, and a controlling circuit for controlling the plurality of driving circuits. The input terminal is used for inputting a signal to a first block of the plurality of blocks. The first signal line is used for transferring the signal input to the first block from the input terminal to a second block adjacent to the first block. The first buffer is used for shaping a waveform of the signal transferred to the second block from the first block and is disposed in a path of the first signal line.

If a routed signal line between the input terminal and the first block is increased to such an extent that a waveform of a signal may be degraded due to parasitic capacitance in the signal line, preferably, a second buffer may be disposed in a path of the signal line between the input terminal and the first block and positioned where the signal line is divided into substantially equal portions. The second buffer enables driving while dividing the capacitance in the line, and therefore, delays in the line are advantageously reduced. The second buffer may comprise a plurality of buffers, each being arranged where the line is divided into substantially equal portions, and this structure is effective.

Each of the driving circuits may include a power transistor, and the controlling circuit may include a decoder, a shift register, and an AND circuit.

The at least one input terminal may include a plurality of input terminals so that a recording data signal, a clock signal for inputting the recording data signal, a latch signal for latching the recording data signal, and a heat-enabling signal for driving the driving circuits are input from the plurality of input terminals.

According to a second aspect of the present invention, a recording head includes the recording-head element substrate having the structure described above.

The recording head may be an inkjet recording head for performing recording by discharging ink by using the recording elements for generating thermal energy.

According to a third aspect of the present invention, a recording apparatus includes the recording head having the structure described above and performs recording by using the recording head.

Therefore, the buffer circuit for shaping a waveform of a logic signal is arranged in the path of the signal line between logic circuits of the element substrate and positioned where the line is divided into substantially equal portions, so that adverse effects resulting from parasitic components are avoided even when the line length is long.

For example, in an inkjet recording-head element substrate (heater board), as the number of nozzles for discharging ink is increased (the number of recording elements is increased), the spaces between a plurality of shift registers are inevitably increased. Even in this case, arranging the buffer for shaping a waveform of a signal at a position where a data line between the shift registers is divided into substantially equal portions in a path thereof suppresses delays resulting from the line or deformation of the waveform.

Additionally, a buffer for shaping a waveform of a clock signal for performing an operation of a shift register or a latch signal for storing data in a latch circuit to retain a data signal transferred from the shift register may be arranged in a corresponding line.

In order to reduce the difference in time for which a current flows through a heater between a first end and a second end of a nozzle array resulting from delays in a line or changes in the pulse width, a buffer may be arranged in a path of a corresponding line. This leads to a reduction in the difference in timing at which a current flows through a heater resulting from the difference in the positions of the nozzles.

Further objects, features and advantages of the present invention will become apparent from the following description of the preferred embodiments with reference to the attached drawings.

DESCRIPTION OF THE PREFERRED EMBODIMENTS

The preferred embodiments are described below with reference to the accompanying drawings.

The terms "recording" and "printing" in this specification refer to producing information in a wide sense as including any representation, such as characters, pictures, images, patterns, and other presentations, on a recording medium and processing a recording medium.

The term "recording medium" herein refers not only to paper, which is used in a common general recording apparatus, but also to any other medium capable of accepting ink, such as cloth, plastic film, metal, glass, ceramic, wood, leather, and the like.

The terms "ink" and "liquid" herein should be interpreted in a wide sense, like the term "recording (printing)" described above, and refer to liquid capable of being used for production of information, such as characters, images, and patterns, on a recording medium, for processing a recording medium, and for ink processing (for example, solidification or insolubilization of a colorant contained in ink provided on the recording medium).

The term "nozzle" herein indicates a device including a discharge opening, a path for carrying liquid leading to the discharging opening, and an element for generating energy used for discharging ink, except where specifically noted.

The term "element substrate" described below refers to a substrate provided with an element, a line, and the like, not to a silicon-semiconductor substrate only. The element substrate may take the form of plate.

The term "on an element substrate" herein refers not only to an upper part relative to the element substrate, but also to a surface of the element substrate and an area adjacent to the surface inside the element substrate. The term "building into" herein indicates forming an element integrally on the element substrate by the same process of producing a semiconductor circuit, not to depositing an individual element on the element substrate.

Figure 1:
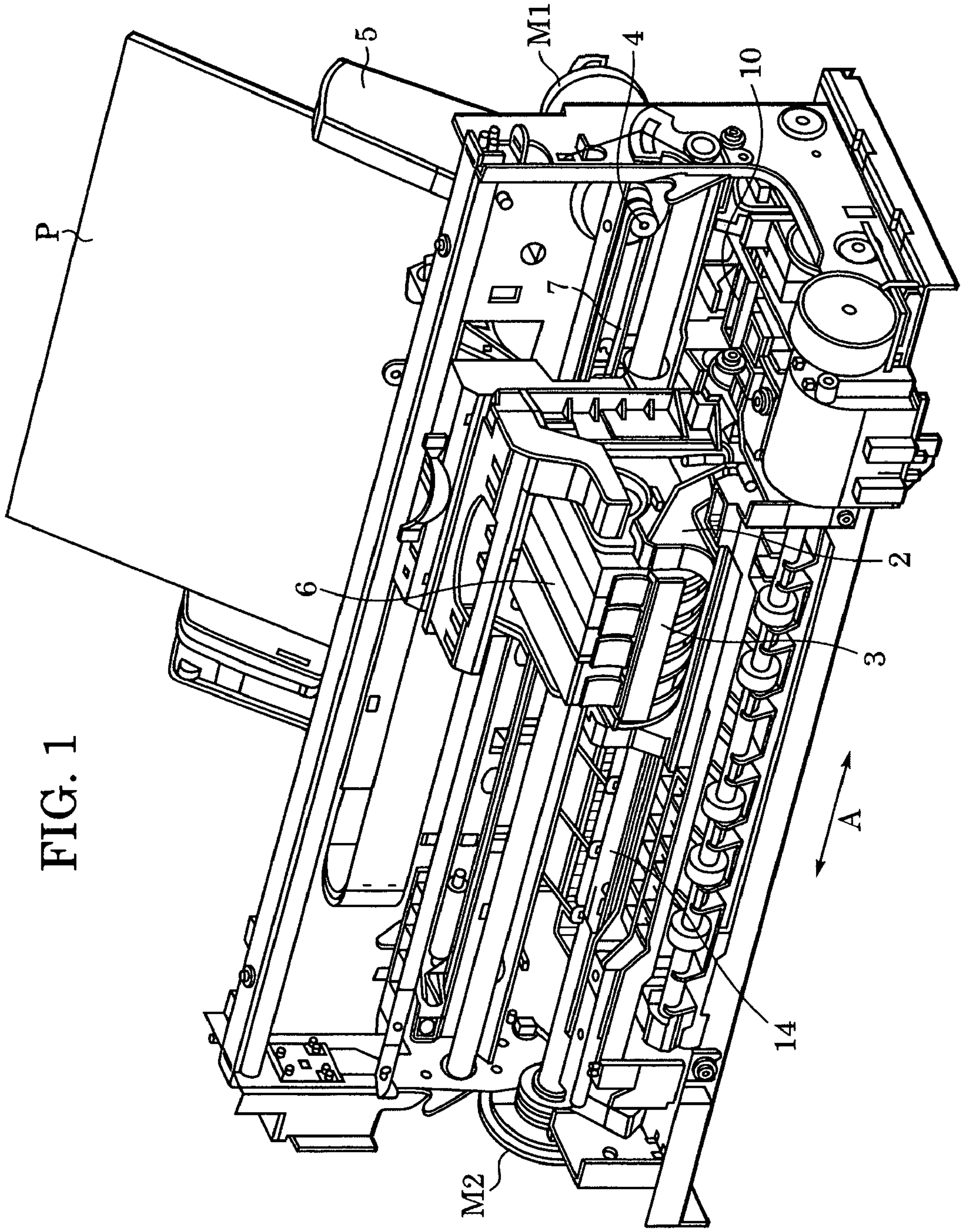
FIG. 1 is a perspective view schematically showing an inkjet recording apparatus according to an embodiment of the present invention.

Inkjet Recording Apparatus (FIG. 1)

FIG. 1 is a perspective view schematically showing an inkjet recording apparatus 1 according to a typical embodiment of the present invention.

As shown in FIG. 1, in the inkjet recording apparatus (hereinafter referred to as a recording apparatus) 1, a carriage 2 on which a recording head 3 for recording by discharging ink using a inkjet method is mounted receives a driving force generated by a carriage motor M1 via a transferring mechanism 4. The carriage 2 is then moved reciprocally in the direction of the arrow A, and a recording medium P, such as a sheet of recording paper, is fed into the recording apparatus 1 via a feeding mechanism 5 and conveyed up to a recording position. Then, the recording head 3 discharges ink on the recording medium P so as to record information.

Additionally, in order to maintain a good condition of the recording head 3, the carriage 2 is moved to a position of a recovery unit 10 to intermittently perform discharge recovery of the recording head 3.

The carriage 2 of the recording apparatus 1 has an ink cartridge 6 attached thereto for reserving ink to be supplied to the recording head 3, in addition to the recording head 3 mounted thereon. The ink cartridge 6 is removable from the carriage 2.

The recording apparatus 1, as shown in FIG. 1, is capable of color recording. The carriage 2 contains four ink cartridge units, one each for magenta (M), cyan (C), yellow (Y), and black (K). These four ink cartridge units are removable individually.

Surfaces of both the carriage 2 and the recording head 3 are properly in contact with each other so that a required electrical connection therebetween is realized and maintained. Upon application of energy in response to a recording signal, the recording head 3 selectively discharges ink from a plurality of discharging openings for recording. The recording head 3 of this embodiment uses an inkjet method that discharges ink by using thermal energy, and therefore, it discharges ink from a discharging opening corresponding to an electrothermal converting element to which a pulsed voltage is applied in response to a recording signal.

In FIG. 1, a conveying motor M2 is used for driving a conveying roller 14 so as to convey the recording medium P.

Figure 2:
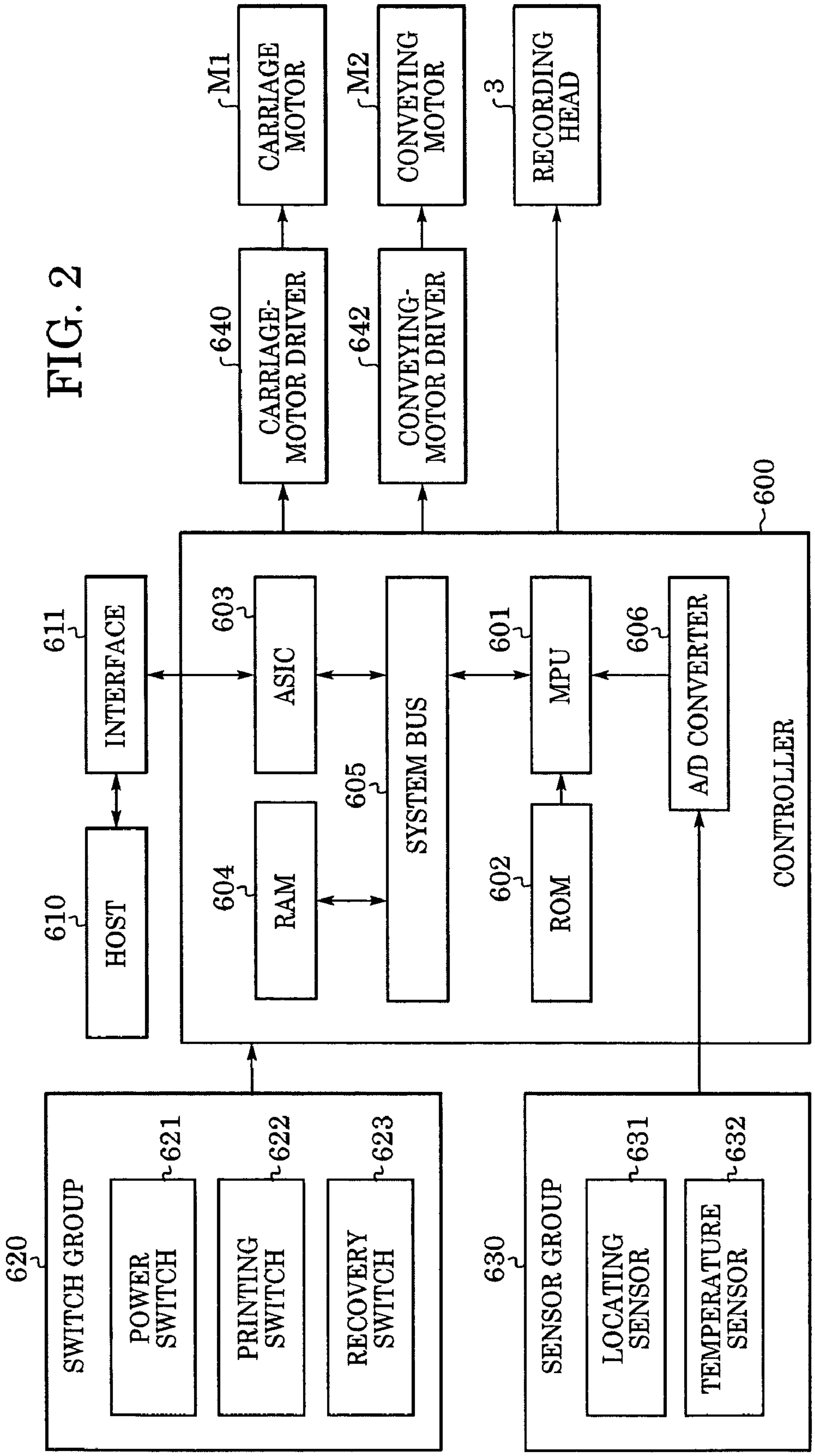
FIG. 2 is a block diagram showing a controlling circuit in the recording apparatus illustrated in FIG. 1.

Control of Inkjet Recording Apparatus (FIG. 2)

FIG. 2 is a block diagram showing a control configuration in the recording apparatus illustrated in FIG. 1.

As shown in FIG. 2, a controller 600 mainly includes a microprocessing unit (MPU) 601; a read-only memory (ROM) 602 for storing a program supporting a control sequence, described later, a required table, and other fixed data; an application-specific integrated circuit (ASIC) 603 for generating control signals for controlling the carriage motor M1, the conveying motor M2, and the recording head 3; a random-access memory (RAM) 604 containing an area for expanding image data and a work area for executing a program; a system bus 605 for connecting the MPU 601, the ASIC 603, and the RAM 604 interactively to send and receive data; and an A/D converter 606 for converting an analog signal received from a group of sensors, which are described below, and supplying a digital signal to the MPU 601.

In FIG. 2, a host 610 is a computer functioning as a source for supplying image data. The host 601 may be a device for capturing an image or a digital camera. The host 610 and the recording apparatus 1 exchange image data, commands, status signals, and the like with each other via an interface (I/F) 611.

A switch group 620 contains switches for receiving instructions from a user. Examples of such switches include a power switch 621, a printing switch 622 used for beginning printing, and a recovery switch 623 used for starting processing (recovery processing) for maintaining a good condition of ink-discharging performance of the recording head 3. A sensor group 630 contains sensors for detecting the condition of the apparatus. Examples of such sensors include a locating sensor 631, such as a photocoupler, for detecting a home position, h, and a temperature sensor 632 for detecting an environmental temperature; these sensors are arranged at appropriate points.

A carriage-motor driver 640 is used for driving the carriage. motor M1 to reciprocally move the carriage 2 in the direction of the arrow A. A conveying-motor driver 642 is used for driving the conveying motor M2 to convey the recording medium P.

For recording performed by the recording head 3, the ASIC 603 transfers driving data (DATA) with respect to a recording element (heater) to the recording head 3 while directly accessing a storage area of the RAM 604.

Figure 3:
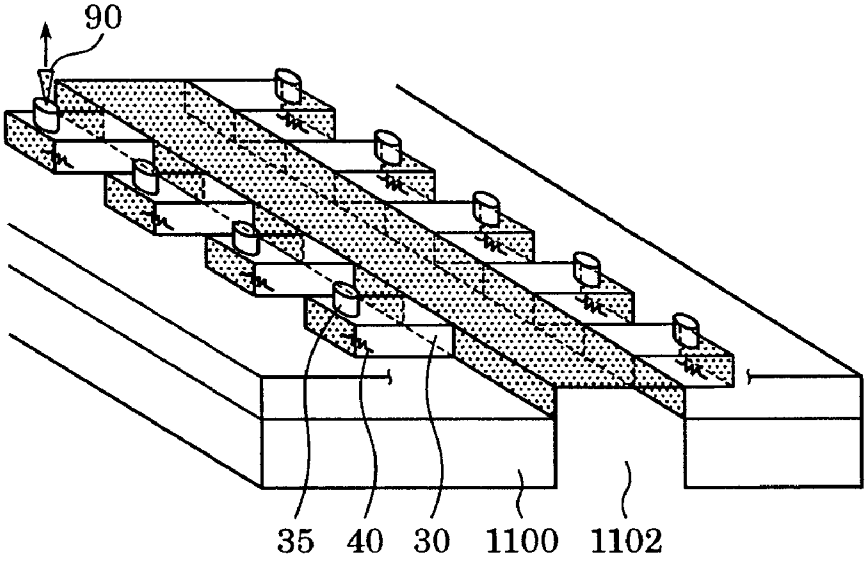
FIG. 3 is a perspective view showing the three-dimensional structure of a part that discharges black ink in a recording head.

Structure of Ink Path and Ink Discharging Opening of Recording Head (FIG. 3)

FIG. 3 is a perspective view showing the three-dimensional structure of a part that discharges black ink in the recording head 3.

A flow of ink supplied from an ink cartridge unit 6K containing black (K) ink is described with reference to FIG. 3. The recording head 3 includes an ink-supplying channel 1102 for supplying black (K) ink. A supplying path (not shown) for supplying black ink to the ink-supplying channel 1102 from the back of a substrate 1100 is linked to the ink cartridge unit 6K.

Black ink passing in the ink-supplying channel 1102 is introduced to electrothermal converting elements (heaters) 40 formed on the substrate 1100 via ink paths 30. When a current flows through a heater of the electrothermal converting elements (heaters) 40 via a circuit, which is described later, the heater of the electrothermal converting elements (heaters) 40 heat ink disposed thereon. The ink boils and forms a bubble of vapor. The bubble pushes the ink, so that an ink droplet 90 is discharged from a corresponding one of a plurality of discharging openings 35. The recording head 3 in this embodiment uses a recording method in which ink is discharged, but it may use a dye-sublimation or a thermal recording method. In addition, the present invention is applicable to a recording head using a piezoelectric element as the recording element.

The substrate 1100, as shown in FIG. 3, is a recording-head substrate (hereinafter referred to as a head substrate or heater board) including the electrothemal converting elements, which are described later, various circuits for driving these electrothermal converting elements, a memory, various pads serving as electrical contacts to the carriage 2, and various signal lines.

The electrothermal converting elements (heaters) are also referred to as recording elements.

FIG. 3 three-dimensionally shows the structure for discharging black ink in the recording head 3. The structure of discharging ink of the other three colors is similar to this, except that the structure for discharging the three-color inks is three times larger than that for black ink. In other words, it has three ink-supplying channels and a head substrate about three times the size of that for black ink.

Figure 4:
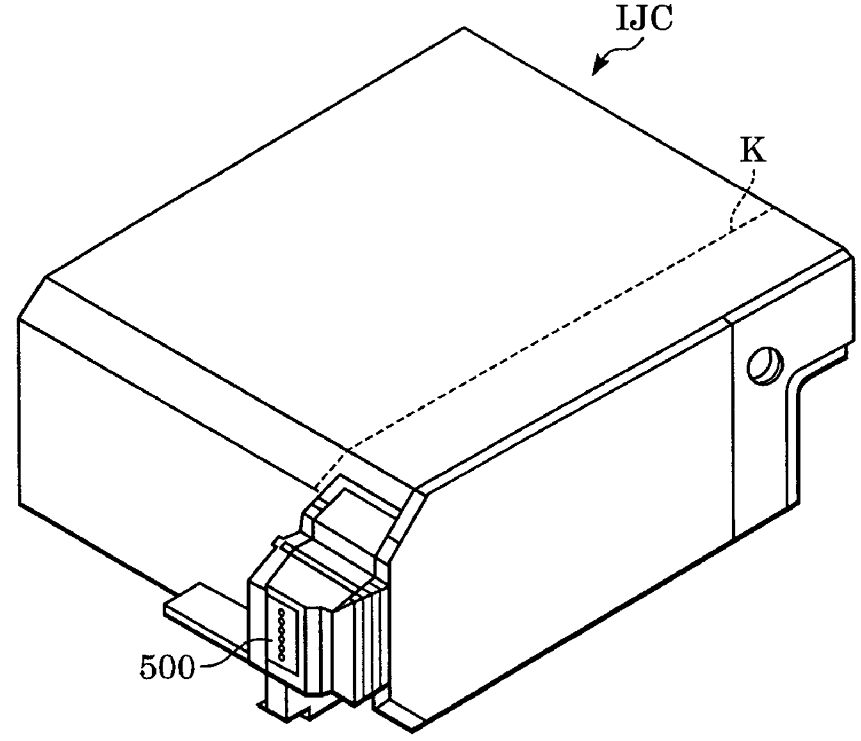
FIG. 4 is a perspective view showing a head cartridge IJC, in which an ink cartridge and a recording head are integrally mounted.

Structure of Head Cartridge (FIG. 4)

As described above, the ink cartridge and the recording head are removable from each other so that they are replaceable with new ones individually. Both the ink cartridge and the recording head may be formed integrally so that the entire component can be replaced with a new one.

FIG. 4 is a perspective view showing a head cartridge IJC, in which the ink cartridge and the recording head are integrally mounted. The head cartridge IJC, as shown in FIG. 4, includes an ink cartridge unit IT arranged to the left of the dotted line K and a recording head unit IJH arranged to the right of the dotted line K. The head cartridge IJC is provided with an electrode (not shown) for receiving an electrical signal supplied from the carriage 2 when being mounted on the carriage 2. The recording head unit IJH is driven by this electrical signal, so that ink is discharged.

As shown in FIG. 4, the recording head unit IJH includes an ink discharging opening array 500. The ink cartridge unit IT includes fibrous or porous absorptive materials for retaining ink and is filled with ink.

As a method for filling the ink cartridge unit IT of the head cartridge IJC with ink, injecting ink externally through a hole formed in an exterior wall of the head cartridge IJC or injecting ink from another area while internal air is being suck out through a vent may be used.

Embodiments of a recording head that can be mounted in the inkjet recording apparatus, as described above, will now be described below.

First Embodiment

Figure 5:
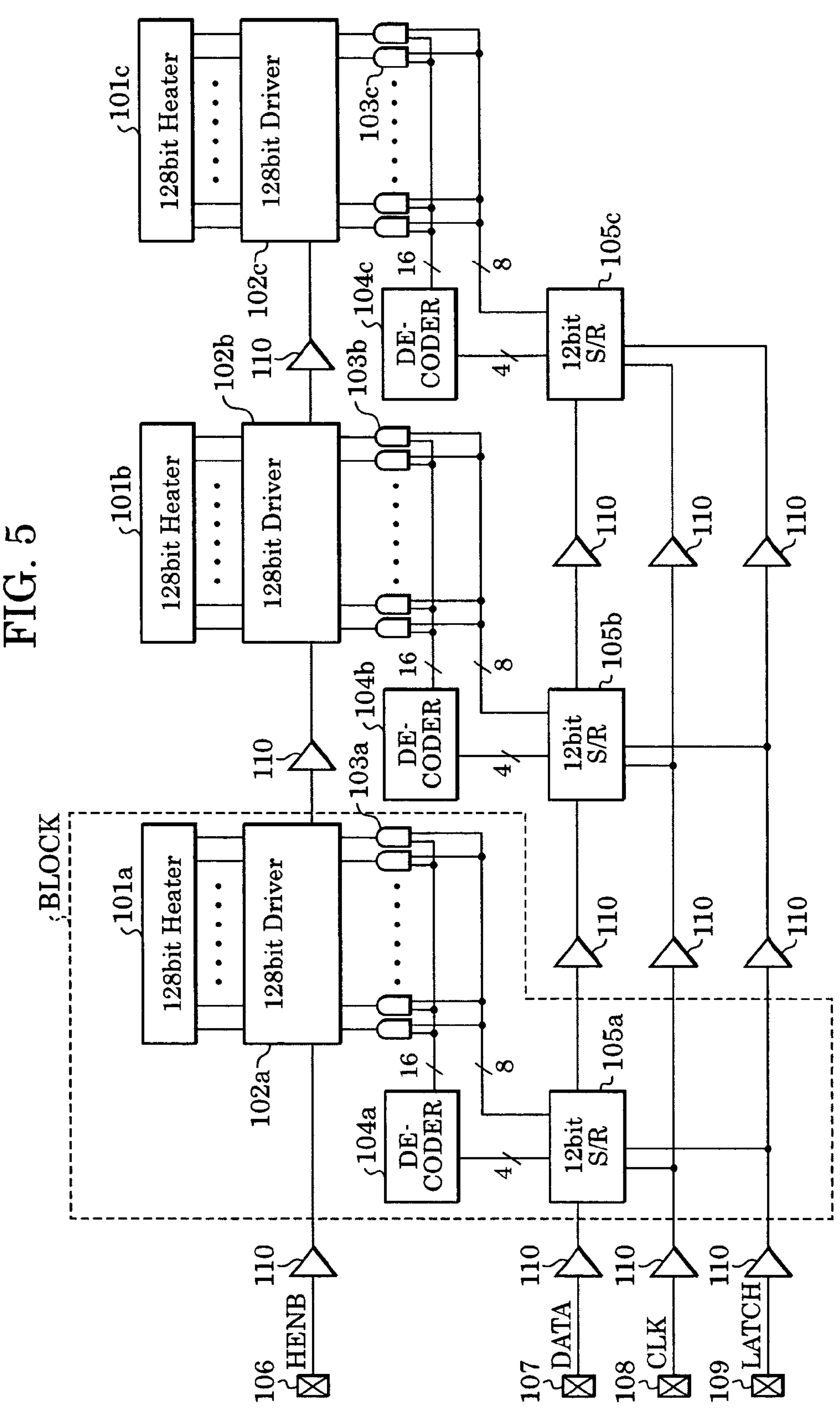
FIG. 5 is a block diagram showing a heater board of a recording head according to a first embodiment.

FIG. 5 is a block diagram showing a heater board (element substrate) of a recording head according to a first embodiment.

The heater board described in this embodiment includes three blocks arranged on the same heater board at regular intervals, each block including a heater array having 128 heaters.

First, circuits in a first block among these three blocks are described below. The first block is most adjacent to input terminals 106 to 109. As is apparent from FIG. 5, components are the same among these three blocks. Therefore, the same components bear the same reference numerals with suffixes “a”, “b”, and “c” so as to be distinguished among these three blocks.

A heater array 101_a_ (represented as 128 bit Heater in FIG. 5) containing 128 heaters included in the first block is connected to a driver array 102_a_ (represented as “128 bit Driver” in FIG. 5) containing the same number of drivers as heaters. These drivers are individually connected to the heaters so as to drive each of the heaters. The driver array 102_a_ is connected to AND gates 103_a_ for determining the on or off state with respect to individual drivers. A driver connected to an AND gate whose output is determined to be true is selected in order to activate a corresponding heater.

The input terminal 106 is used for applying a signal (referred to as a heat-enabling signal (HENB)) for specifying a time for which a current flows through a heater. The driver selected by the AND gate is activated and a current flows through the corresponding heater only for a time for which the HENB signal is applied.

In this embodiment, the AND gates 103*a* for selecting the drivers each have two input terminals. One input terminal of each of the AND gates 103*a* is connected to output from a decoder (represented as "DECODER". in FIG. 5) 104*a*. The decoder 104*a* deals with a 4-bit input and a 16-bit output. One input terminal of the AND gate 103*a* is connected to any one bit of the 16-bit output. The other input terminal of the AND gate 103*a* is connected to any one bit of the output (8-bit output) of a 12-bit shift register 105*a* (represented as "12 bit S/R" in FIG. 5). The remaining four bits of output from the 12-bit shift register 105*a* are connected to an input terminal of the decoder 104*a*, so that these four bits of data are decoded into a 16-bit signal in the decoder 104*a*.

In this embodiment, a 16-bit output from the decoder 104*a* and an 8-bit output from the 12-bit shift register 105*a* are subjected to an AND operation so that a desired heater among the 128 heaters is selected and driven. The 128 heaters are driven in a time shared manner in units of 16 sections divided by using the 16-bit output from the decoder 104*a*. The maximum number of heaters simultaneously driven is eight. This occurs when all eight bits of output data from the 12-bit shift register 105*a* are determined to be true.

Signals applied when data is transferred to the 12-bit shift register 105*a* will now be described.

The 12-bit shift register 105*a* is connected to a data-signal input terminal 107 for a data signal (DATA), a clock-signal input terminal 108 for a clock signal (CLK) to indicate a timing for capturing data, and a latch-signal input terminal 109 for a latch signal (LATCH) to indicate a timing for temporarily storing transferred data so as to receive three types of signals from these input terminals.

Among these signals externally applied, the heat-enable signal (HENB), the clock signal (CLK), and the latch signal (LATCH) are supplied to other blocks over signal lines without being processed. As for the data signal (DATA), since data output from a 12-bit shift register (e.g., the 12-bit shift register 105*a*) is connected to an input terminal of an adjacent 12-bit shift register (e.g., a 12-bit shift register 105*b*) to receive the data signal (DATA), data is transferred in serial form.

In this embodiment, as shown in FIG. 5, the three blocks, each containing the 128 heaters and the 12-bit shift register, are arranged on the single element substrate, and the individual 12-bit shift registers are serially connected to one other. Therefore, the 12-bit shift registers of the heater board in this embodiment are effectively considered to be a 36-bit shift register.

In a case in which the distance between these blocks on the heater board is large, the length of signal lines for transferring data signals, clock signals, and latch signals increases correspondingly.

The increase in the line length leads to an increase in the time required for transferring these signals. Accordingly, as indicated in the description of the related art, in a case in which processing at high speeds is required, adverse effects, such as signal delays or failures in data transfer at a desired frequency, may occur. To overcome these adverse effects, in this embodiment, buffers 110 for shaping waveforms are arranged in paths of the lines between the blocks, as well as at positions adjacent to the input terminals 106 to 109. In other words, the buffers 110 are individually arranged where each of the signal lines between the shift registers in the blocks is divided into substantially equal portions. The buffers 110 lie in a DATA line for data signals, a CLK line for clock signals, and a LATCH line for latch signals between one shift register and another. In this embodiment, one of the buffers 110 lies in a signal line for heat-enabling signals (HENB) used for heating the heaters. These buffers suppress a decrease in the operating frequency of a shift register resulting from parasitic resistance and parasitic capacitance existing in the lines.

Examples of such a case, in which the distance between the blocks is large, include a case in which nozzles for discharging ink of different colors are arranged in each block, a case in which nozzles must be arranged at regular intervals to ensure a long recording width, and a case in which a sufficient distance between the blocks is required in order to provide ink-introducing paths corresponding to the nozzles.

In accordance with the first embodiment, for a heater board including a plurality of blocks, one each containing a certain number of heaters and integrally formed circuits for driving the heaters, since buffers for shaping waveforms are arranged in paths of lines between the blocks and individually positioned where each of the lines is divided into substantially equal portions, even when it is necessary to have a long distance between the blocks in view of the structure of the inkjet recording head, signals are prevented from being degraded. As a result, superior recording is realized.

Second Embodiment

There is a case in which a circuit used for data input must be arranged relative to positions of nozzles of a recording head and arranging a block including the circuit ideally relative to positions of pads (input terminals) is impossible. Specifically, for example, two circuits, each described in the first embodiment, are arranged laterally, so that six heater arrays, each having 128 heaters, are arranged on a single heater board.

Figure 6A:
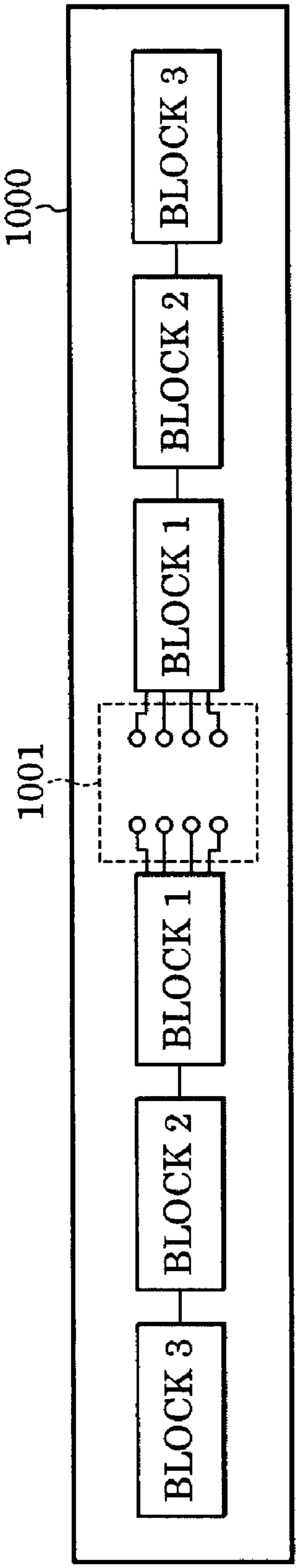
FIGS. 6A and 6B are block diagrams, each showing an example of the structure of the heater board.
Figure 6B:
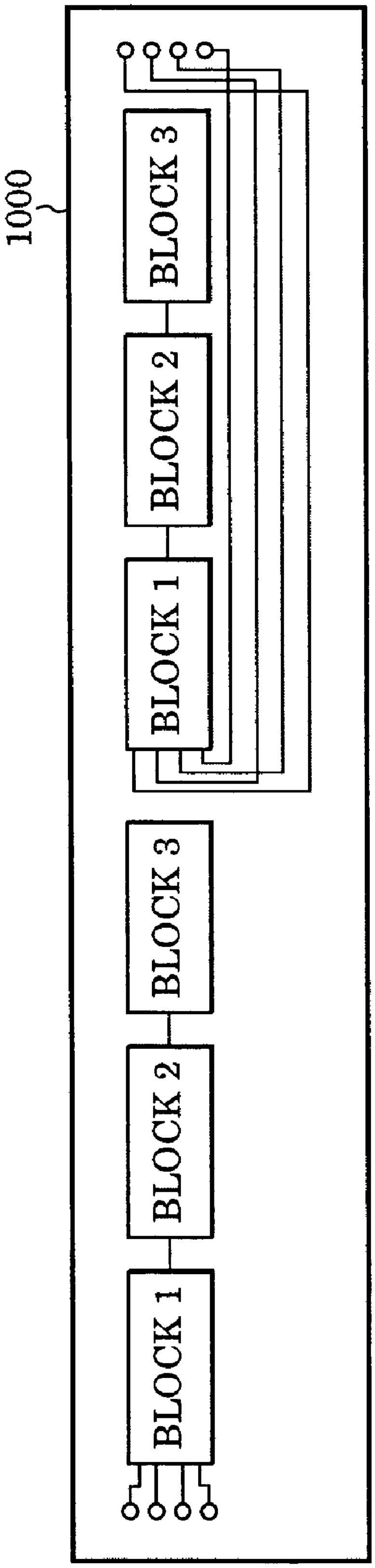

FIGS. 6A and 6B are block diagrams showing examples of the structure of the heater board.

More specifically, in order to apply different data signals, clock signals, and the like to three blocks, for an arrangement shown in FIG. 6A, in which two circuits are arranged according to a block configuration illustrated in FIG. 5 in the first embodiment, mounting is impossible since the pads (input terminals) must be arranged in a central portion 1001 of a heater board 1000.

Therefore, in order to realize the same orientation with respect to the blocks 1 to 3 in one circuit as that in the other, it is necessary to arrange the pads (input terminals) at ends of the heater board by routing lines, as shown in FIG. 6B. As a result, in the heater board, the blocks of circuits, as described in the first embodiment, are arranged laterally.

However, in this block configuration, the distance of routed signal lines from buffers on an input end to circuit blocks is longer than that shown in the first embodiment. Therefore, this routed line portion may lead to a decrease in an operating speed of circuitry resulting from parasitic resistance and parasitic capacitance.

In the second embodiment, even in an arrangement shown in FIG. 6B, the operating speed is not decreased.

Figure 7:
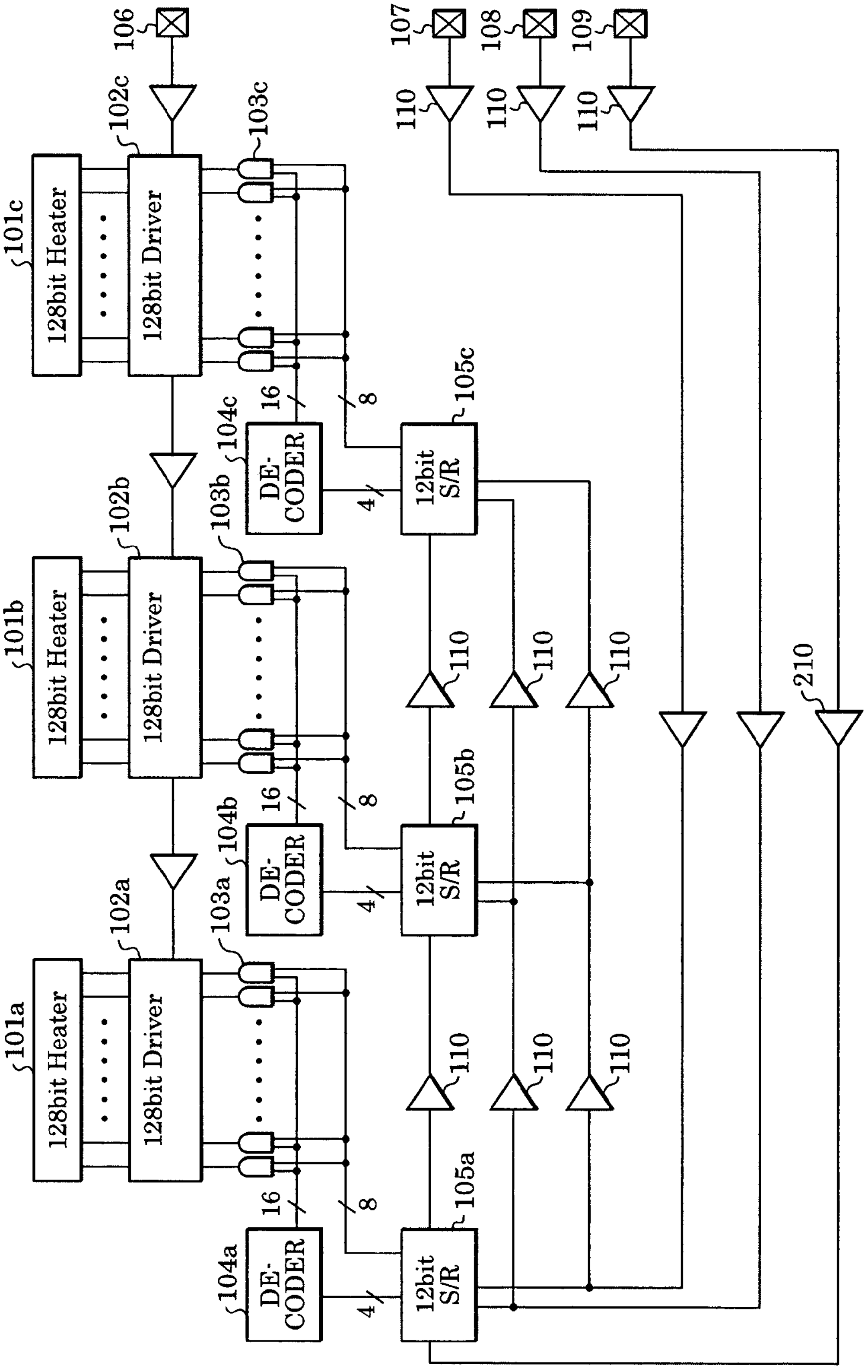
FIG. 7 is a block diagram showing a heater board of a recording head according to a second embodiment.
Figure 8:
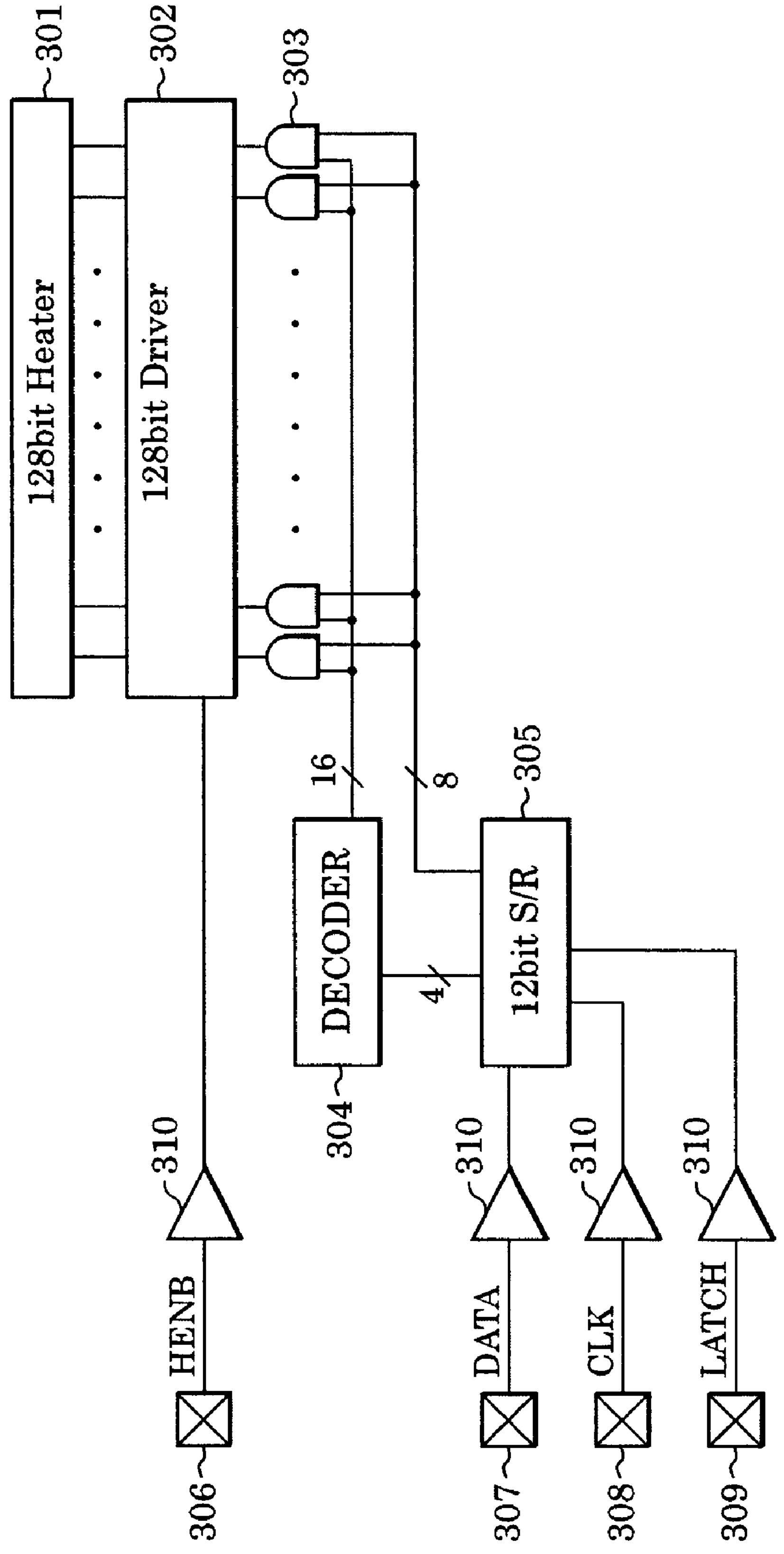
FIG. 8 is a block diagram schematically showing a known heater board.

FIG. 7 is a block diagram showing the structure of a heater board (a layout on the heater board) of a recording head according to the second embodiment. The heater board in this embodiment includes three blocks, each block containing a heater array having 128 heaters, arranged on the same heater board at regular intervals, as in the case of the first embodiment.

In FIG. 7, the same components as in the first embodiment have the same reference numerals, and the explanation thereof is omitted. Only characteristic structures are described below.

The structure of the second embodiment is different from that of the first embodiment in that positions of pads (input terminals) for inputting signals are opposite to positions for data input of shift registers in view of the layout. In particular, buffers 210 are individually arranged where each of signal lines between the buffers 110 adjacent to the input terminals 106 to 109 and the circuit blocks is divided into substantially equal portions so as to shape waveforms of signals again, suppressing a decrease in the operating speed of the circuitry.

In the second embodiment, the buffers 110 are arranged so as to shape waveforms of signals between the blocks, as is the case with the first embodiment.

According to this embodiment, even when the signal lines are routed in view of the layout of the heater board and thus the length of the signal lines is longer, since the buffers arranged in paths of the routed lines shape waveforms of signals, the signals are prevented from being degraded. As a result, superior recording is realized. Preferably, the buffers are individually positioned where each of the lines is divided into substantially equal portions.

In the embodiments described above, an inkjet recording head according to a bubble-jet method for rapidly heating ink using a heating element (heater), vaporizing ink, forming a bubble, and discharging a droplet by means of pressure in the bubble through an orifice is used. It is obvious that the present invention is applicable to a recording head for recording by a method other than this bubble jet method.

In this case, as an alternative to the heater resistors used in the embodiments described above, a device suitable for the adopted method is used.

In the embodiments described above, droplets discharged from the recording head and liquid in an ink reservoir are ink. However, the content is not limited to ink. For example, a fluid discharged onto a recording medium to increase fixing or watertightness of a recorded image or improve the quality of the recorded image may be stored in the ink reservoir.

The recording head according to the embodiments described above is applicable to a full-line-type recording head having a length corresponding to the maximum width of a recording medium recorded by a recording apparatus. A recording-head assembly in which a plurality of recording heads having the same structure as that described above are combined to meet the maximum width may be used. A recording head in which a plurality of the recording heads are formed integrally so as to function as a single recording head may be used.

Additionally, a recording head cartridge in which an ink reservoir (container) is integrated in the recording head described in the embodiments may be used. A replaceable-chip-type recording head may be used. In this case, upon attachment to a recording apparatus, this chip-type recording head can realize an electrical connection to the recording apparatus and receive ink supplied from the recording apparatus. The recording ink cartridge may have an ink reservoir filled with ink.

As described above, the buffers arranged in the signal lines on the recording-head substrate shape waveforms of signals. Therefore, for example, even when the number of recording elements and the recording width are increased in order to improve the recording speed, adverse effects caused by parasitic resistance and parasitic capacitance are minimized and a decrease in the recording speed resulting from delays in a line is thus suppressed, thus achieving superior recording at high speeds.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalents structures and functions.

This application claims priority from Japanese Patent Application No. 2004-015523 filed Jan. 23, 2004, which is hereby incorporated by reference herein.

What is claimed is:

1. An inkjet recording head comprising:

an element substrate, the element substrate comprising a first input terminal for inputting a data signal, a second input terminal for inputting a clock signal; and a plurality of blocks, each block including:

a plurality of recording elements, wherein the recording elements facilitate the discharging of ink by generating thermal energy;

a plurality of driving circuits for driving the plurality of recording elements;

a decode circuit for generating a signal to select driving circuits to be driven among the plurality of driving circuits for performing time-division driving; and a shift register for holding data to be output for the decode circuit, a first signal line which connects between the first input terminal and each of the shift registers included in each block serially; and a second signal line which connects between the second input terminal and each block serially and which connects between the second input terminal and each of the shift registers included in each block;

wherein a first buffer disposed between each block on the first signal line, and a second buffer is disposed between each block on the second signal line.

2. An inkjet recording head according to claim 1, further comprising:

a third input terminal for inputting a latch signal; and a third signal line which connects between the second input terminal and each block serially and which connects between the second input terminal and each of the shift registers included in each block, wherein a third buffer is disposed between each block on the third signal line.

3. A recording apparatus comprising:

the inkjet recording head according to claim 1.

* * * * *